(12) United States Patent
Chang

(10) Patent No.: US 9,052,455 B2
(45) Date of Patent: Jun. 9, 2015

(54) HEAD-WORN ILLUMINATORS AND MAGNIFIERS WITH OPTICAL REJECTION COATINGS TO ASSIST MEDICAL AND DENTAL PROFESSIONALS

(75) Inventor: Byung J. Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 282 days.

(21) Appl. No.: 13/526,075

(22) Filed: Jun. 18, 2012

(65) Prior Publication Data

US 2012/0320454 A1 Dec. 20, 2012

Related U.S. Application Data

(60) Provisional application No. 61/498,043, filed on Jun. 17, 2011.

(51) Int. Cl.
*G02B 5/20* (2006.01)
*G02B 25/02* (2006.01)
*F21V 5/04* (2006.01)
*F21V 21/084* (2006.01)
*F21W 131/20* (2006.01)
*F21W 131/202* (2006.01)
*F21Y 101/02* (2006.01)

(52) U.S. Cl.
CPC .............. *G02B 5/208* (2013.01); *G02B 25/02* (2013.01); *F21V 5/04* (2013.01); *F21V 21/084* (2013.01); *F21W 2131/20* (2013.01); *F21W 2131/202* (2013.01); *F21Y 2101/02* (2013.01)

(58) Field of Classification Search
None
See application file for complete search history.

(56) References Cited

U.S. PATENT DOCUMENTS

| | | | |
|---|---|---|---|
| 5,428,474 A * | 6/1995 | Murphy | ................. 359/361 |
| 7,673,989 B2 | 3/2010 | Chang | |
| 8,047,684 B2 | 11/2011 | Chang | |
| 2011/0305007 A1 | 12/2011 | Chang | |

* cited by examiner

*Primary Examiner* — Jennifer L. Doak
(74) *Attorney, Agent, or Firm* — Gifford, Krass, Sprinkle, Anderson & Citkowski, P.C.

(57) ABSTRACT

An improved head-mounted optical illuminator or magnifier of the type worn by a medical or dental professional includes an optical coating applied to one or more optical surfaces associated with the illuminator or magnifier, and wherein the optical coating is a rejection coating operative to blocks wavelengths in the green, blue, violet and/or ultraviolet portions of the electromagnetic spectrum, depending upon the embodiment. Short-wavelength coatings (blue/violet/uv) may be applied to the surface of a lens used in a head-worn illuminator, for example to the beam-forming optics. The head-worn illuminator may be an LED illuminator, xenon illuminator, or other high-intensity source. In the case of the green notch filter coatings, these would typically only be applied to a head-worn magnifier, including flip-up and through-the-lens styles. In all embodiments, the optical coating may be a multilayer dielectric coating, a holographic filter, or utilize other optical filter technology.

32 Claims, 3 Drawing Sheets ll
HEAD-WORN ILLUMINATORS AND MAGNIFIERS WITH OPTICAL REJECTION COATINGS TO ASSIST MEDICAL AND DENTAL PROFESSIONALS

REFERENCE TO RELATED APPLICATION

This application claims priority from U.S. Provisional Patent Application Ser. No. 61/498,043, filed Jun. 17, 2011, the entire content of which is incorporated herein by reference.

FIELD OF THE INVENTION

This invention relates generally to illuminators and magnifiers of the type worn by medical and dental professionals and, in particular, to such instruments with optical coatings to reject certain optical wavelengths, including filters in the green to assist visualization and filters in the blue, violet and ultraviolet to protect users from harmful rays.

BACKGROUND OF THE INVENTION

There are a wide variety of head-worn illuminators and magnifiers intended for surgeons, dentists and other professionals. Increasingly, the illuminators are taking advantage of high-intensity light sources which emit in all portions of the spectrum, including blue, violet and ultraviolet. It is known that wavelengths in these parts of the spectrum may be harmful to a clinician's eyes, particularly when used in conjunction with extended procedures requiring intense focus and concentration.

At the same time, there is a different set of issues with surgical magnification systems: Human organs are essentially made up of three colors, namely, blue (veins or nerves), red (blood), and yellow (fat). However, human eyes are the most sensitive at 555 nm (green) and this sensitivity gradually decreases as the wavelength increases or decreases from 555 nm. Human eyes become very insensitive at wavelengths shorter than 400 nm or longer than 700 nm. Many surgeons want brighter light to see details of the surgical site, but more light may not help surgeons to see details and may lead to eye strain, particularly if excessive blue, violet or ultraviolet light is present.

SUMMARY OF INVENTION

This invention resides in an improved head-mounted optical illuminator or magnifier of the type worn by a medical or dental professional. The improvement broadly comprises an optical coating applied to one or more optical surfaces associated with the illuminator or magnifier, and wherein the optical coating is a rejection coating operative to blocks wavelengths in the green, blue, violet and/or ultraviolet portions of the electromagnetic spectrum, depending upon the embodiment.

In accordance with one embodiment of the invention to protect a user's eyes from potentially harmful short wavelengths, the optical coating blocks wavelengths below about 500 nm, and more preferably wavelengths below 400 nm. In this case the coating exhibits a transmission curve having a slope and a minimum transmission characteristic, either or both of which may be varied in accordance with the application of the illuminator or magnifier. In a different embodiment of the invention to improve blue and red colors to better visualize human organs, strength of green wavelengths is reduced, thereby enhancing blue and red colors.

In the case of the short wavelength coatings (blue/violet/uv), these coatings may be applied to the surface of a lens used in a head-worn illuminator, for example to the beam-forming optics. The head-worn illuminator may be an LED illuminator, xenon illuminator, or other high-intensity source. In addition to or apart from the illuminator, the optical coating may be applied to the surface of a lens used in a head-worn magnifier, such as an optical loupe or telemicroscope assembly. Both flip-up and through-the-lens styles of loupe or telemicroscope assemblies may be accommodated.

In the case of the green filter coatings, these would typically only be applied to the head-worn magnifier, but again, both flip-up and through-the-lens styles would benefit. In all embodiments, the optical coating may be a multilayer dielectric coating, a holographic filter, or utilize other optical filter technology.

DETAILED DESCRIPTION OF THE INVENTION

Short Wavelength Filters

The light generated by existing light-emitting diode (LED) illuminators is quite poor. Current illuminators of this kind use reflecting optical elements or singlet or multiple lenses with reflecting optical elements. Commonly assigned U.S. Pat. No. 8,047,684, improves upon existing designs by providing an illuminator with an adjustable beam pattern. The preferred embodiment includes a housing, a light-emitting diode (LED) disposed in the housing outputting light through a distal opening in the housing, an achromatic doublet lens mounted in the opening in the housing, and a singlet lens disposed between the LED and the achromatic lens. The distance between the singlet lens and the doublet lens may be adjustable, and/or distance between the LED and the singlet lens may be adjustable, through a threaded connections, for example.

Figure 1:
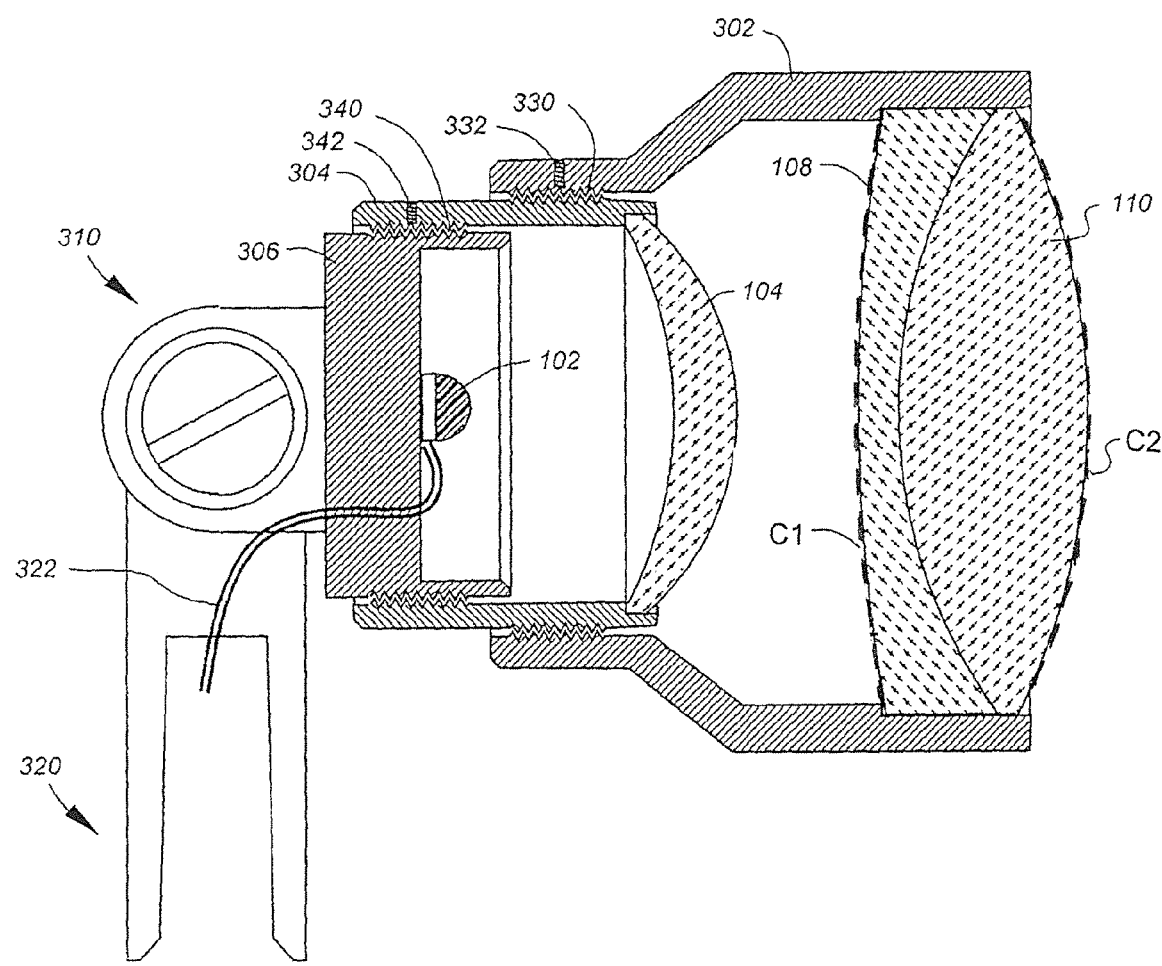
FIG. 1 is a cross section of a previously described LED illuminator with improved beam quality.

As shown in FIG. 1, the illuminator uses one singlet lens 104 and one achromatic doublet lens 106 (made with one positive and one negative lens 108, 110). The system is based upon a high-intensity white-emitting LED 100 including an integral lens 102, which may be spherical. Doublet 108, 110, is disposed in a housing 302; singlet 104 is disposed in housing 304, and LED 102 is mounted within housing 306. The housings are coupled via threaded connections 330, 340, with set screws 332, 342 and/or an adhesive being used to fix the relative positions. The base housing 306 is preferably coupled to a mechanism for head mounting such as clip-on type connector 320 through hinge 310. The cord for the LED is depicted at 322.

The illuminator described with reference to FIG. 1 produces intense light, including light in the blue, violet and ultraviolet parts of the spectrum which may be harmful to the eyes of a user, particularly following prolonged periods of concentrated use. Accordingly, in accordance with this invention, a rejection coating is applied to one or more surfaces of the lenses in the system. In the preferred embodiment, such coatings are applied to the beam-forming optics, indicated by either or both of the surfaces C1, C2. Of course, the invention is not limited to the illumination disclosed in the '684 patent and may be used with any type of illuminator including that shown in co-pending U.S. application Ser. No. 13/216,866, the entire content of which is incorporated herein by reference.

Figure 2:
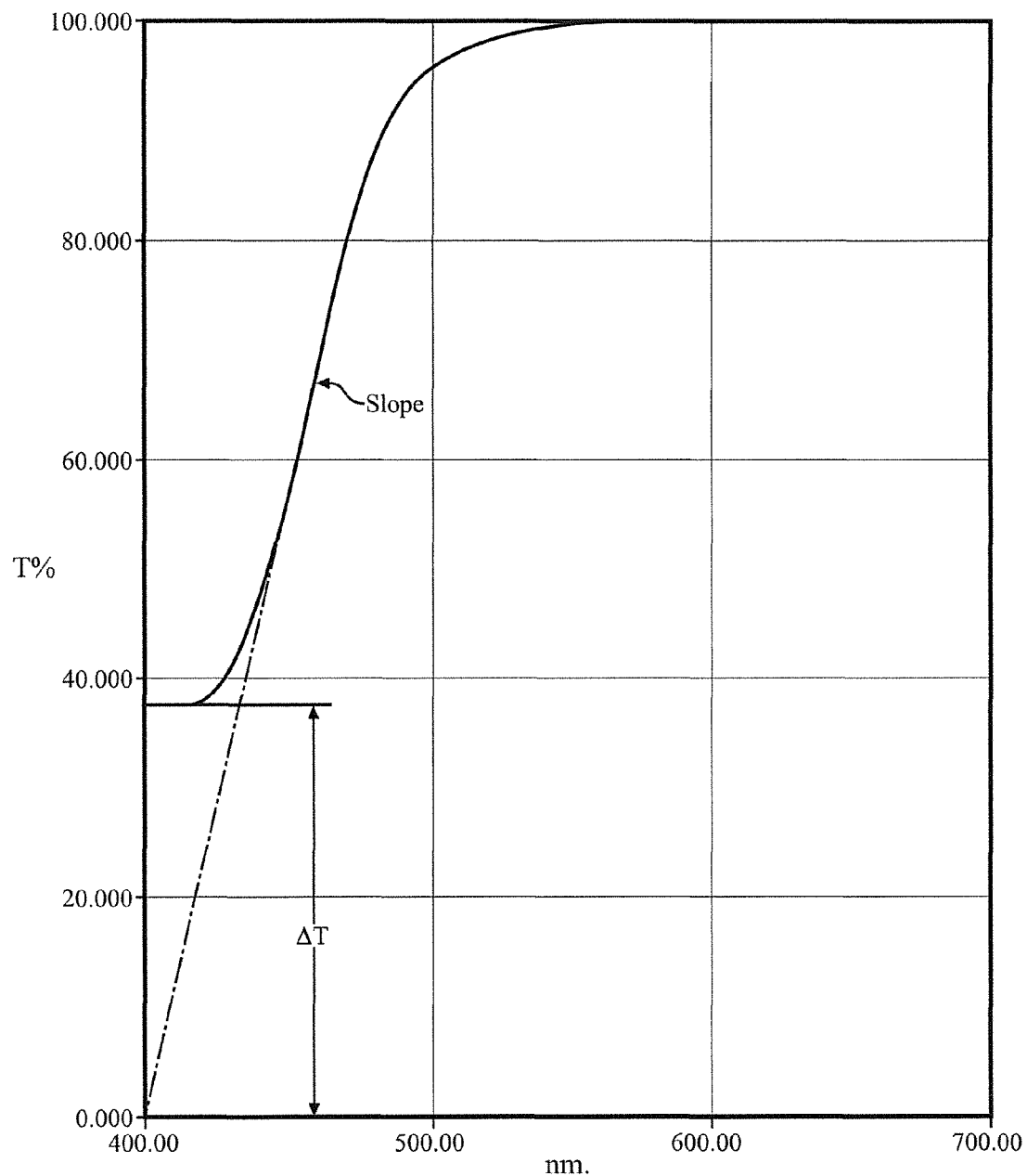
FIG. 2 is a transmission curve of blue and ultraviolet rejection coatings applicable to the present invention.

Any appropriate optical filter technology may be used in accordance with the invention, including multilayer dielectric coatings, holographic filters, and so forth. FIG. 2 is a transmission curve of a rejection coating applicable to the present invention. As seen in this diagram, transmission begins to rise around 400 nm or thereabouts and, by about 500 nm or thereabouts, transmission reaches or approaches 100%, thereby functioning as a bandstop filter (or bandpass filter for wavelengths above about 400 nm). The minimum transmission characteristic ($\Delta T$) and/or the slope of the curve may both be variable, however, depending upon the light source used.

The invention is not limited in terms of the light source used, and is equally applicable to LED sources of the type described herein, simpler LED sources without beam-forming optics, and other emitters such as xenon lights. The blue/uv rejection coatings may also be used on the optical surfaces of magnifiers, including loupes, telescopes and microscopes, including head-worn units, whether or not such rejection coatings are used on the light source.

Green Rejection Notch Coatings

Figure 3:
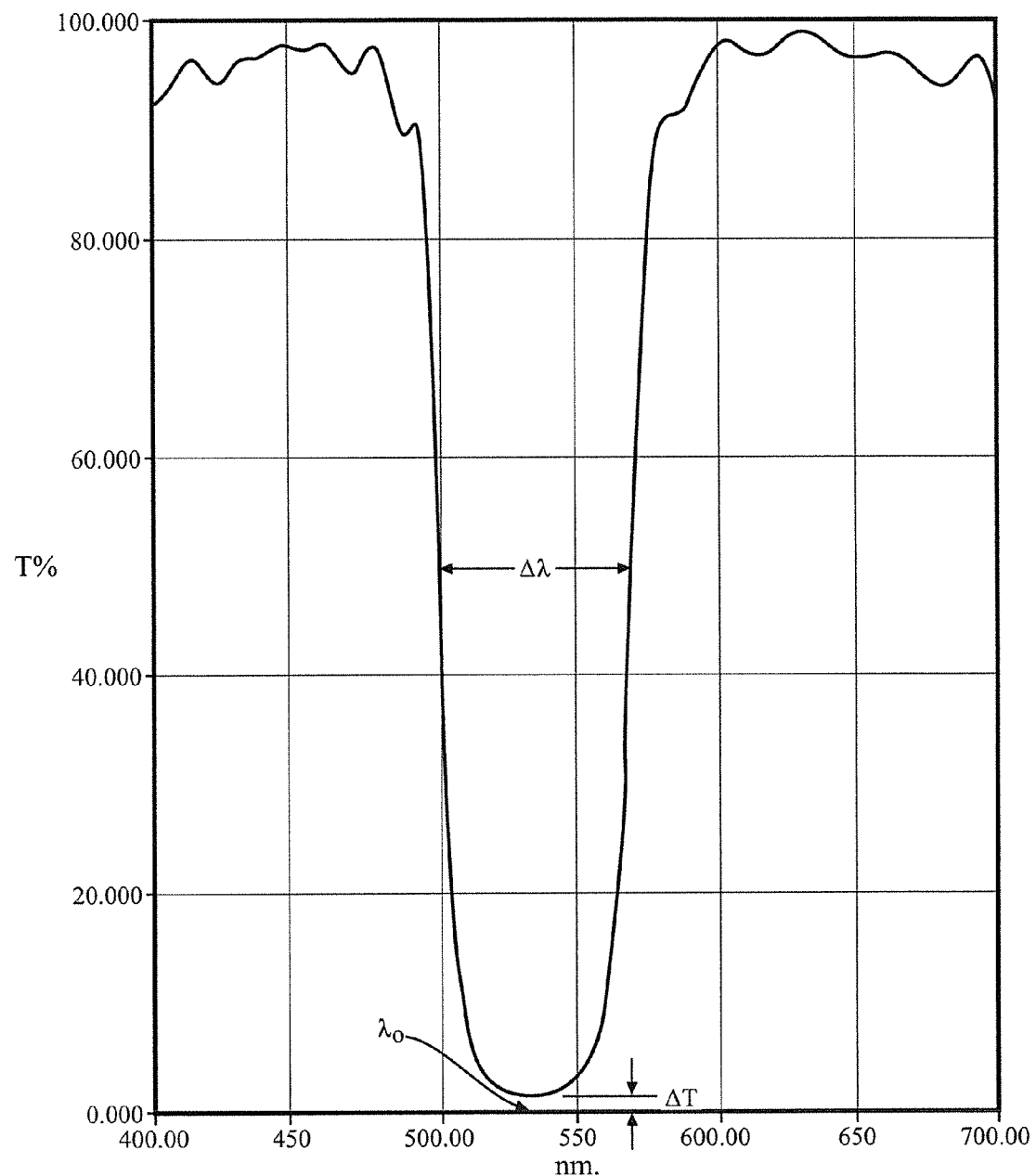
FIG. 3 is a transmission curve of green rejection notch coatings applicable to the present invention.

In accordance with a different aspect of the invention, FIG. 3 shows a transmission curve of filters used to enhance primary colors encountered in surgical procedures (i.e., red and blue). In the preferred embodiment of this aspect of the invention, transmission is dramatically reduced between about 500 nm and 575 nm, centered at about 535 nm ($\lambda_c$). The center wavelength ($\lambda_c$), minimum transmission characteristic ($\Delta T$) and/or bandwidth ($\Delta\lambda$) may also be independently varied in accordance with the application.

While a coating with the transmission characteristics of FIG. 3 may be applied to light sources, they are typically applied to lenses and other optical surfaces found in head-worn loupes, telescopes and microscopes. As one example of many, U.S. Pat. No. 7,673,989, the entire content of which is incorporated herein by reference discloses telemicroscopic loupes with removable, replaceable lens caps. In such a case, the coatings of this invention may be applied to either surface of lens elements 106 or 108, or any of the surfaces associated with the removable, replaceable components 200 or lens element 112.

I claim:

1. A head-mounted optical illuminator or magnifier of the type worn by a medical or dental professional, the improvement comprising:
   an optical coating applied to one or more optical surfaces associated with the illuminator or magnifier, the coating being applied entirely across each respective optical surface, leaving no non-coated areas;
   wherein the optical coating is a rejection coating operative to attenuate wavelengths in the blue, violet and ultraviolet portions of the electromagnetic spectrum; and
   wherein the optical coating exhibits a transmission curve with a slope and a non-zero minimum transmission characteristic.

2. The improvement of claim 1, wherein the optical coating blocks wavelengths below about 500 nm.

3. The improvement of claim 1, wherein the optical coating blocks wavelengths below 400 nm.

4. The improvement of claim 1, wherein the optical coating blocks wavelengths below about 500 nm.

5. The improvement of claim 1, wherein the optical coating exhibits a transmission curve having a slope and a minimum transmission characteristic; and
   wherein the slope, minimum transmission characteristic, or both, may be varied in accordance with the application of the illuminator or magnifier.

6. The improvement of claim 1, further including a head-worn illuminator; and
   wherein the optical coating is applied to the surface of a lens used in the head-worn illuminator.

7. The improvement of claim 1, further including a head-worn illuminator; and
   wherein the optical coating is applied to the beam-forming optics used in the head-worn illuminator.

8. The improvement of claim 1, further including a head-worn LED illuminator; and
   wherein the optical coating is applied to the surface of a lens used in the head-worn LED illuminator.

9. The improvement of claim 1, further including a head-worn xenon illuminator; and
   wherein the optical coating is applied to the surface of a lens used in the head-worn xenon illuminator.

10. The improvement of claim 1, further including a head-worn magnifier; and
    wherein the optical coating is applied to the surface of a lens used in the head-worn magnifier.

11. The improvement of claim 1, further including a head-worn loupe or telemicroscope assembly; and
    wherein the optical coating is applied to the surface of a lens used in the head-worn optical loupe or telemicroscope assembly.

12. The improvement of claim 1, wherein the optical coating is a multilayer dielectric coating.

13. A head-mounted optical magnifier of the type worn by a medical or dental professional, the improvement comprising:
    an optical coating applied to one or more optical surfaces associated with the magnifier, the coating being applied entirely across each respective optical surface, leaving no non-coated areas;
    wherein the optical coating is a green rejection notch coating operative to enhance red and blue wavelengths associated with body organs visualized during a surgical procedure; and
    wherein the optical coating exhibits a transmission curve with a bandwidth and a non-zero minimum transmission characteristic.

14. The improvement of claim 13, wherein the optical coating center wavelength ($\lambda_c$) of about 535 nm.

15. The improvement of claim 13, wherein the optical coating exhibits a bandwidth ($\Delta\lambda$) which blocks wavelengths between about 500 and 575 nm.

16. The improvement of claim 13, wherein the optical coating exhibits center wavelength ($\lambda_c$), minimum transmission characteristic ($\Delta T$) and a bandwidth ($\lambda_c$); and
    wherein $\lambda_c$, $\Delta T$, and $\Delta\lambda$ may also be independently varied in accordance with the application.

17. The improvement of claim 13, further including a head-worn magnifier; and
    wherein the optical coating is applied to the surface of a lens used in the head-worn magnifier.

18. The improvement of claim 13, further including a head-worn optical loupe or telemicroscope assembly; and
    wherein the optical coating is applied to the surface of a lens used in the head-worn optical loupe or telemicroscope assembly.

19. The improvement of claim 13, wherein the optical coating is a multilayer dielectric coating.

20. Medical/dental apparatus, comprising:
an optical instrument including at least one optical surface;
a mechanism enabling the instrument to be worn on the head of a user; and
an optical coating applied entirely over the optical surface, leaving no non-coated areas, the optical coating being a rejection coating operative to attenuate wavelengths in the green, blue, violet and/or ultraviolet portions of the electromagnetic spectrum; and
wherein the optical coating exhibits a transmission curve with a slope and a non-zero minimum transmission characteristic.

21. The apparatus of claim 20, wherein the optical coating blocks wavelengths below about 500 nm.

22. The apparatus of claim 20, wherein the optical coating blocks wavelengths below 400 nm.

23. The apparatus of claim 20, wherein the optical coating exhibits a bandwidth ($\alpha\lambda$) which blocks green wavelengths between about 500 and 575 nm.

24. The apparatus of claim 20, wherein the optical coating exhibits a transmission curve having a slope and a minimum transmission characteristic; and
wherein the slope, minimum transmission characteristic, or both, may be varied in accordance with the application.

25. The improvement of claim 20, wherein the optical coating exhibits center wavelength ($\lambda_c$), minimum transmission characteristic ($\Delta T$) and a bandwidth ($\Delta\lambda$); and
wherein $\lambda_c$, $\Delta T$, and $\Delta\lambda$ may also be independently varied in accordance with the application.

26. The apparatus of claim 20, wherein the instrument is a head-worn illuminator.

27. The apparatus of claim 20, wherein:
the instrument is a head-worn illuminator having beam-forming optics; and
the optical coating is applied to the beam-forming optics.

28. The apparatus of claim 20, wherein the instrument is a head-worn LED illuminator.

29. The apparatus of claim 20, wherein the instrument is a head-worn xenon illuminator.

30. The apparatus of claim 20, wherein the instrument is a head-worn magnifier.

31. The apparatus of claim 20, wherein the instrument is a head-worn optical loupe or telemicroscope assembly.

32. The apparatus of claim 20, wherein the optical coating is a multilayer dielectric coating.

\* \* \* \* \*

UNITED STATES PATENT AND TRADEMARK OFFICE
CERTIFICATE OF CORRECTION

| | |
|---|---|
| PATENT NO. | : 9,052,455 B2 |
| APPLICATION NO. | : 13/526075 |
| DATED | : June 9, 2015 |
| INVENTOR(S) | : Byung J. Chang |

Page 1 of 1

It is certified that error appears in the above-identified patent and that said Letters Patent is hereby corrected as shown below:

In the claims,

Column 4, line 56: Replace "$(\lambda_c)$" with --$(\Delta\lambda)$--; and

Column 5, line 21: Replace "$(\alpha\lambda)$" with --$(\Delta\lambda)$--.

Signed and Sealed this
Thirteenth Day of October, 2015

Michelle K. Lee
*Director of the United States Patent and Trademark Office*